United States Patent
Nihei

(10) Patent No.: US 6,477,548 B1
(45) Date of Patent: Nov. 5, 2002

(54) SERVER COMPUTER CAPABLE OF AUTOMATICALLY NOTIFYING UPDATED DATABASE CONTENT TO CLIENT COMPUTER, AND PROGRAM STORAGE MEDIUM

(75) Inventor: Tomoyuki Nihei, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/405,598

(22) Filed: Sep. 27, 1999

(30) Foreign Application Priority Data

Sep. 30, 1998 (JP) ............................................ 10-291315

(51) Int. Cl.[7] .............................................. G06F 17/30
(52) U.S. Cl. ...................... 707/204; 707/200; 707/201; 707/202; 707/203; 707/205
(58) Field of Search ............................. 707/9, 200–205; 705/14, 26; 709/232, 217

(56) References Cited

U.S. PATENT DOCUMENTS

| 5,740,549 A | * | 4/1998 | Reilly et al. | .................. 705/14 |
| 6,047,327 A | * | 4/2000 | Tso et al. | .................. 709/232 |
| 6,138,155 A | * | 10/2000 | Davis et al. | ................. 709/224 |
| 6,151,624 A | * | 11/2000 | Teare et al. | .................. 709/217 |

* cited by examiner

Primary Examiner—Jean M. Corrielus
Assistant Examiner—Cam-Y Truong
(74) Attorney, Agent, or Firm—Frishauf, Holtz, Goodman & Chick, P.C.

(57) ABSTRACT

In a client/server network system, an updated database content is automatically notified from the server computer to all of client computers which have once accessed this database content. In the server computer, an access history record for recording access requests issued from certain client computers is saved in a merchandise information database. When the record of this merchandise information database is changed, the server computer extracts such a client computer which has accessed this database in the past based up on the access history. Then, the server computer notifies a change notification to all of the relevant client computers, so that all of these relevant client computers can recognize the changed database.

5 Claims, 8 Drawing Sheets

CLIENT/SERVER SYSTEM

SERVER COMPUTER

MERCHANDISE INFORMATION DATABASE SDB

RECORD

| MERCHANDISE CODE | MERCHANDISE NAME | REGISTER DATE | ...... | IMAGE LINK NUMBER |
|---|---|---|---|---|

IMAGE FILE

AOC ACCESS HISTORY FILE

| MERCHANDISE CODE | NAME OF RECORD-ACCESSED CLIENT COMPUTER | ACCESS DAY |
|---|---|---|
|  |  |  |
|  |  |  |
|  |  |  |
|  |  |  |
| ⋮ | ⋮ | ⋮ |

RDR DOWNLOAD MANAGEMENT TABLE

| MERCHANDISE CODE | RECORD-ACCESSED OPERATOR | CHANGE DATA |
|---|---|---|
|  |  |  |
|  |  |  |
|  |  |  |

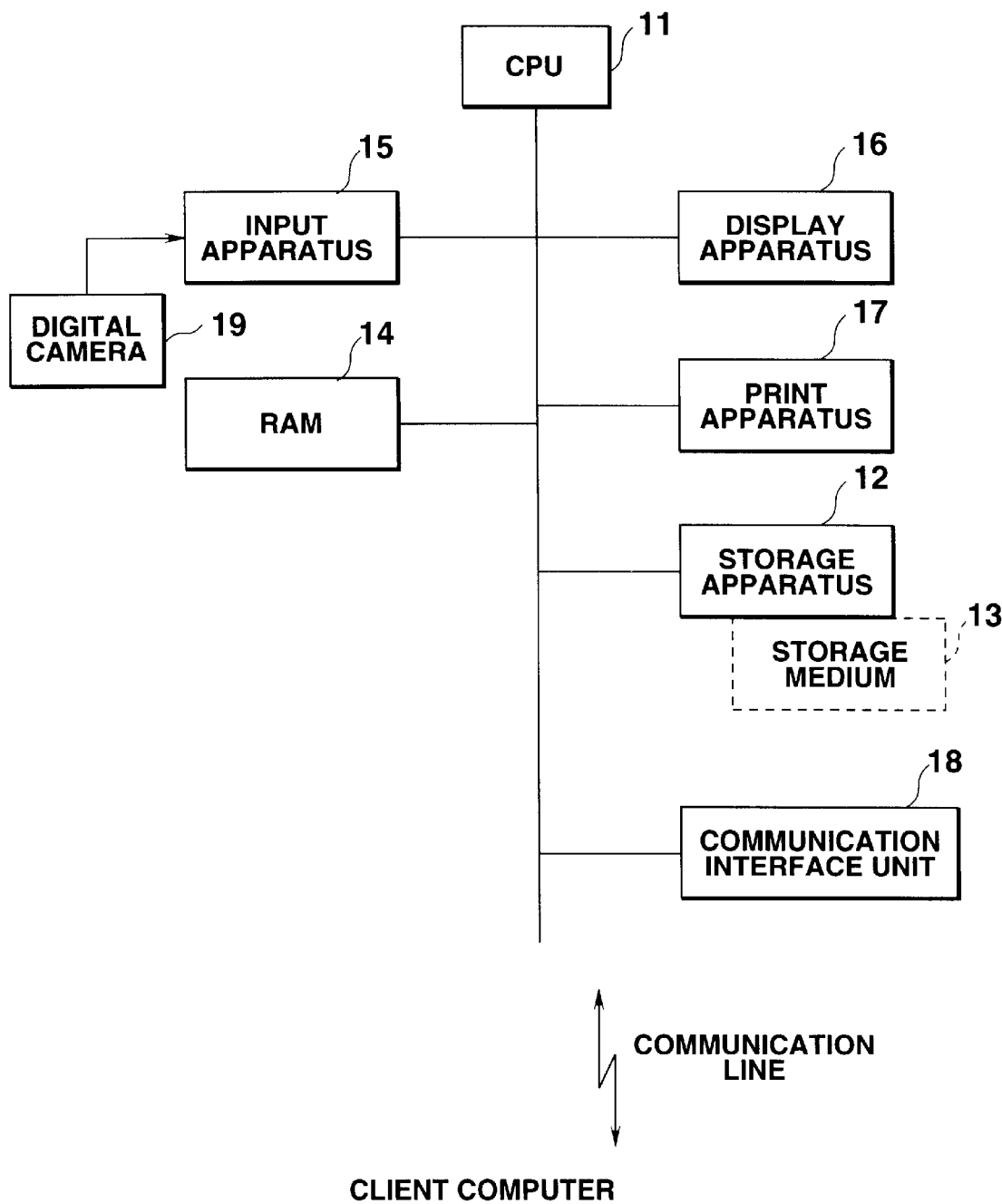

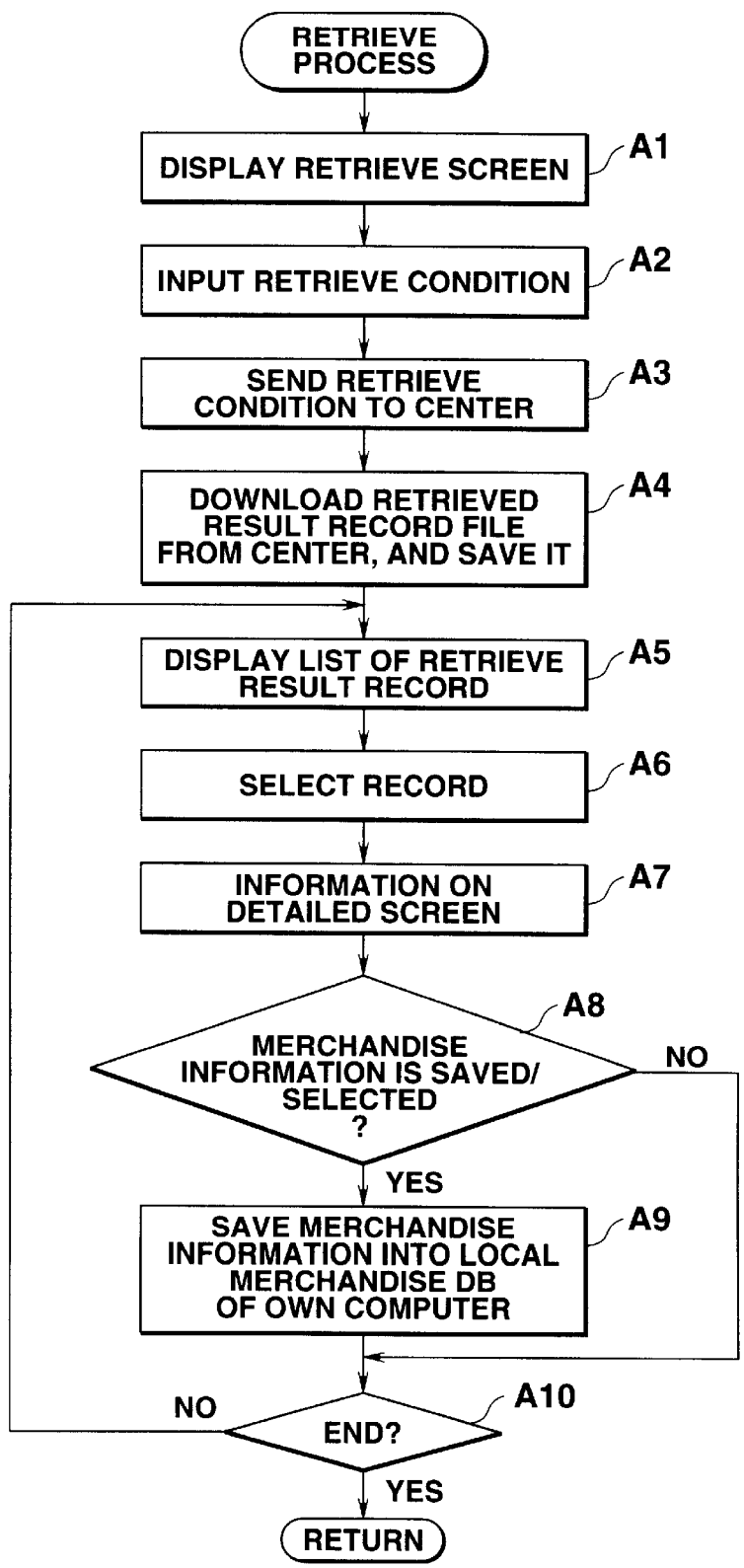

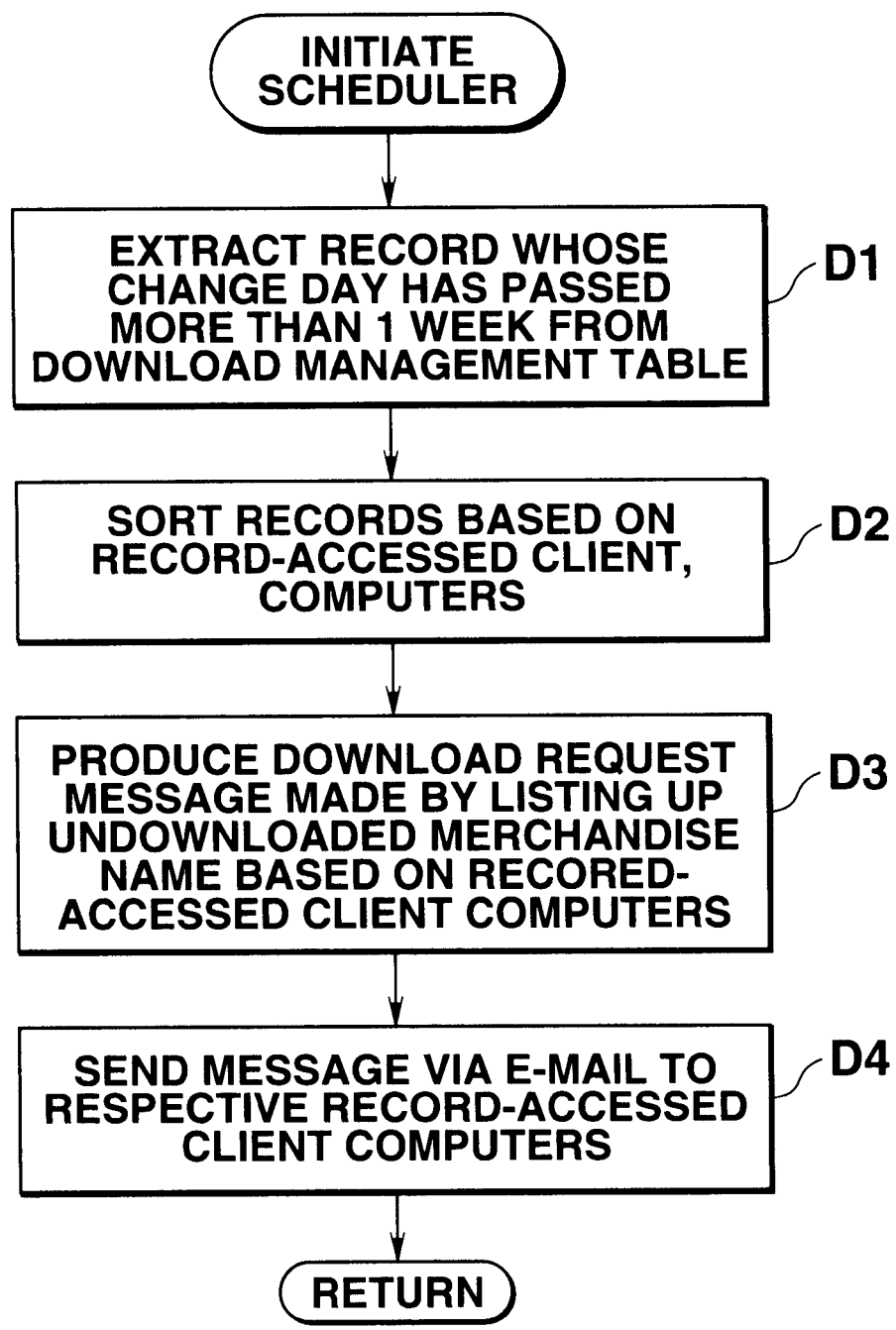

SERVER COMPUTER CAPABLE OF AUTOMATICALLY NOTIFYING UPDATED DATABASE CONTENT TO CLIENT COMPUTER, AND PROGRAM STORAGE MEDIUM

BACKGROUND OF THE INVENTION

1. Technical Field

The present invention generally relates to a server computer operable in a client/server network system in which a plurality of client computers are connected via a communication line to a server computer. More specifically, the present invention is directed to a server computer capable of automatically notifying an updated content of a database to a relevant client computer which has once accessed this database before being updated, and also to a storage medium for recording thereon a program readable by this server computer.

2. Description of the Prior Art

Conventionally, in the case that a server computer provided in one conventional client server system contains a database for storing thereinto a plurality of records, this database is accessed by the respective client computers so as to download a desirable record selected from the plural records to the accessed client computers. Then, these client computers properly utilize the downloaded record.

Normally, the above-described download operation of this desirable record is carried out by operators of these client computers. Then, after the necessary record has been once downloaded in the relevant client computers, even when the relevant record saved in the database is updated later, the operators of these record-accessed client computers can hardly know, or grasp as to whether or not this relevant record is updated. Under such a circumstance, there are many possibilities that although the record contents of the database employed in the server computer have been already updated, the operators of the record-accessed client computers continuously use the old information records which were downloaded in the past.

To avoid such a problem, client computers may regularly check as to whether or not a record content of a database employed in a server computer is uploaded, and may newly download an updated record content if the first-mentioned record content has been updated. However, to achieve this update checking method, the respective client computers are required to regularly check the record contents of the database provided in the server computer. As a result, there is another problem that the work loads given to the respective client computers would be increased.

SUMMARY OF THE INVENTION

The present invention has been made to solve the above-described problem, and therefore, has an object to provide a server computer used in a client/server network system, capable of immediately notifying such information as to whether or not a storage content of a database is updated to a client computer when this client computer issues an access request to the database employed in the server computer.

To achieve the above-described object, a server computer, according to a first aspect of the present invention, is featured by such a server computer containing a database, in which in response to a data access request for the database issued from an arbitrary client computer among a plurality of client computers via a communication line, a content of data stored into said database is provided to the arbitrary client computer for issuing the access request, comprising:

history storing means for specifying a client computer which has issued a data access request via the communication line to the database and functions as an access source, and also for storing thereinto an access history of the specified client computer of the access source;

client computer extracting means for extracting such a client computer based upon the access history stored in the history storing means, the client computer having accessed the content of the database before being updated when the content of the database is updated; and transmitting means for transmitting notification information used to notify the updated database to the client computer extracted by the extracting means.

Also, a server computer, according to a second aspect of the present invention, is featured by such a server computer in which a record accessed by at least one client computer within a database for storing thereinto a plurality of records is provided to the one accessing client computer, comprising:

history storing means for storing thereinto a history of access operation issued from the client computer with respect to each of the plural records every record stored in the database;

updating means for updating an arbitrary record which is required to be updated among the plural records stored in the database; and transmitting means for transmitting notification information used to notify such a fact that the accessed record is updated among the plural records, to the client computer which has accessed the record before being updated.

Furthermore, a storage medium, according to a third aspect of the present invention, is featured by such a storage medium for storing thereinto a computer readable program code, wherein:

the program code is used to realize:

a function for specifying a client computer operable as an access source, which has issued an access request for accessing an arbitrary record via a communication line to a database containing a plurality of records;

a function for storing/managing an access history of the client computers which have accessed the records with respect to each of the records contained in the database;

a function for extracting all of client computers based upon the access history, the all client computers having accessed a record before being updated when the record contained in the database is updated; and a function for transmitting notification information for notifying such a fact that the accessed record has been updated to all of the extracted client computers.

In accordance with the present invention, in the case that the storage content (record) of the database is updated, the client computer which has accessed this database in the past is automatically extracted, and furthermore, such a notification that the content of this database has been updated is automatically notified to this database-accessed client computer. As a result, an operator of this client computer can immediately recognize that the storage content of this database accessed in the past has been updated after the previous database access operation by receiving such a notification transmitted from the server computer. Therefore, this client server again accesses this updated database upon receipt of this notification, so that this operator of the client computer can grasp the latest storage content of this updated database.

As a consequence, operators of all of the client computers which have accessed the database saved in the server computer can continuously acquire the latest updated content of this database.

BRIEF DESCRIPTION OF THE DRAWINGS

For a better understanding of the present invention, reference is made of a detailed description to be read in conjunction with the accompanying drawings, in which:

FIG. 4 schematically represents an overall structural diagram of a client computer CTC operated in the client/server system of FIG. 1;

FIG. 5 is a flow chart for describing operations of the client computer CTC in such a condition that a record retrieving operation is instructed;

FIG. 8 is a flow chart for describing operations of the server computer SRC in such a case that a scheduler is initiated.

DETAILED DESCRIPTION OF THE PREFERRED INVENTION

Referring now to FIG. 1 to FIG. 8, a computer server and a computer program storage medium, according to a preferred embodiment of the present invention, will be described in detail.

Broad Area Communication Network System

Figure 1:
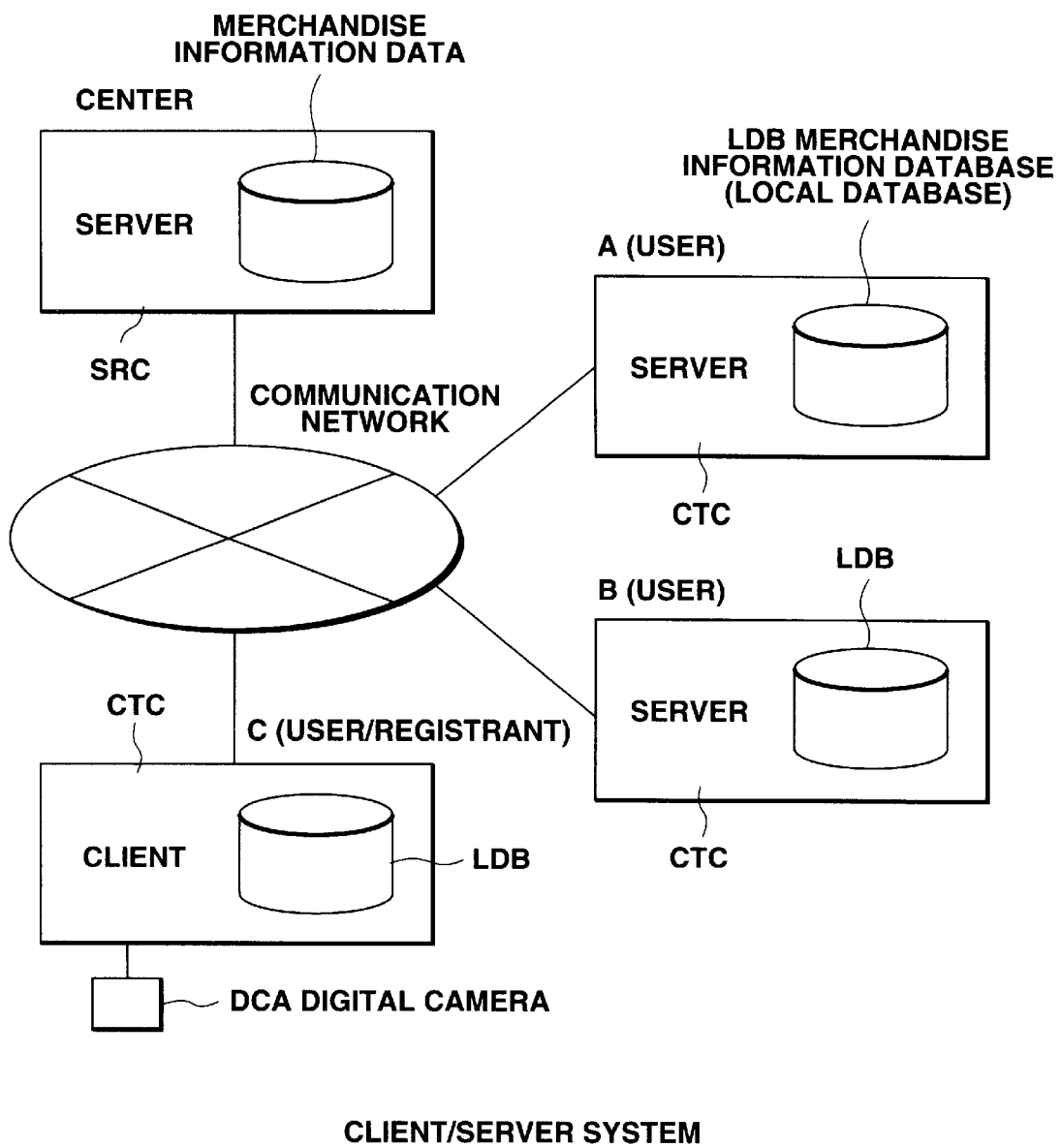
FIG. 1 illustratively shows a network structural diagram of a typical client/server system.

FIG. 1 illustratively shows a broad area communication network system corresponding to a client/server network system in which merchandise (goods) information for constituting a common resource is utilized among chain stores of retail trades and a center, which are extended in a broad scale. In this client/server system, client computers CTC are installed on the side of the respective users, whereas a server computer SRC is installed on the side of the center. The server computer SRC corresponds to such a database server for managing and/or operating a merchandise information database SDB installed on the side of the center. This merchandise information database SDB may be commonly utilized by the respective clients. In the merchandise information database SDB, merchandise information about all of the merchandise is stored as data for 1 record every merchandise. This merchandise information database SDB is managed in a batch mode by the center side. This merchandise information database SDB contains the respective merchandise records and furthermore image files which are linked to these merchandise records. In this embodiment, an image file is such a file for saving thereinto a photographic image of merchandise (commodity), namely an image acquired by photographing an entire outer appearance of merchandise. The users A, B, C, - - - , corresponding to the client computers may access the merchandise information database SDB provided on the center side from remote places, so that these users may arbitrarily read the records so as to utilize the contents of the read records. In this case, when a record retrieving condition is entered from the own client computer CTC, the server computer SRC retrieves such a record which can be met with this record retrieving condition from the merchandise information database SDB, and then transmits the retrieved record to the client computer CTC of a requesting source. Then, the client computer CTC receives this retrieved record to display the received record on a display screen. In this case, when the user instructs a record saving operation, the record which has been transmitted from the serverside is registered/saved into the own merchandise information database (local database) LDB. Furthermore, a specific user C among the above-explained users A, B, C, - - - , has a right as an update registrant (registered operator) who is allowed to update a merchandise record with respect to the merchandise information database SDB. In the case that this registrant C uses a digital camera DCA equal to an image input apparatus so as to input a merchandise image and/or merchandise character information, the content of the merchandise information database SDB provided on the server side in response to the entered merchandise image and the merchandise character information. This merchandise image is produced by photographing an entire outer appearance of a commodity. The merchandise character information indicates an attribute of a commodity.

Overall Structure of Server Computer SRC

Figure 2:
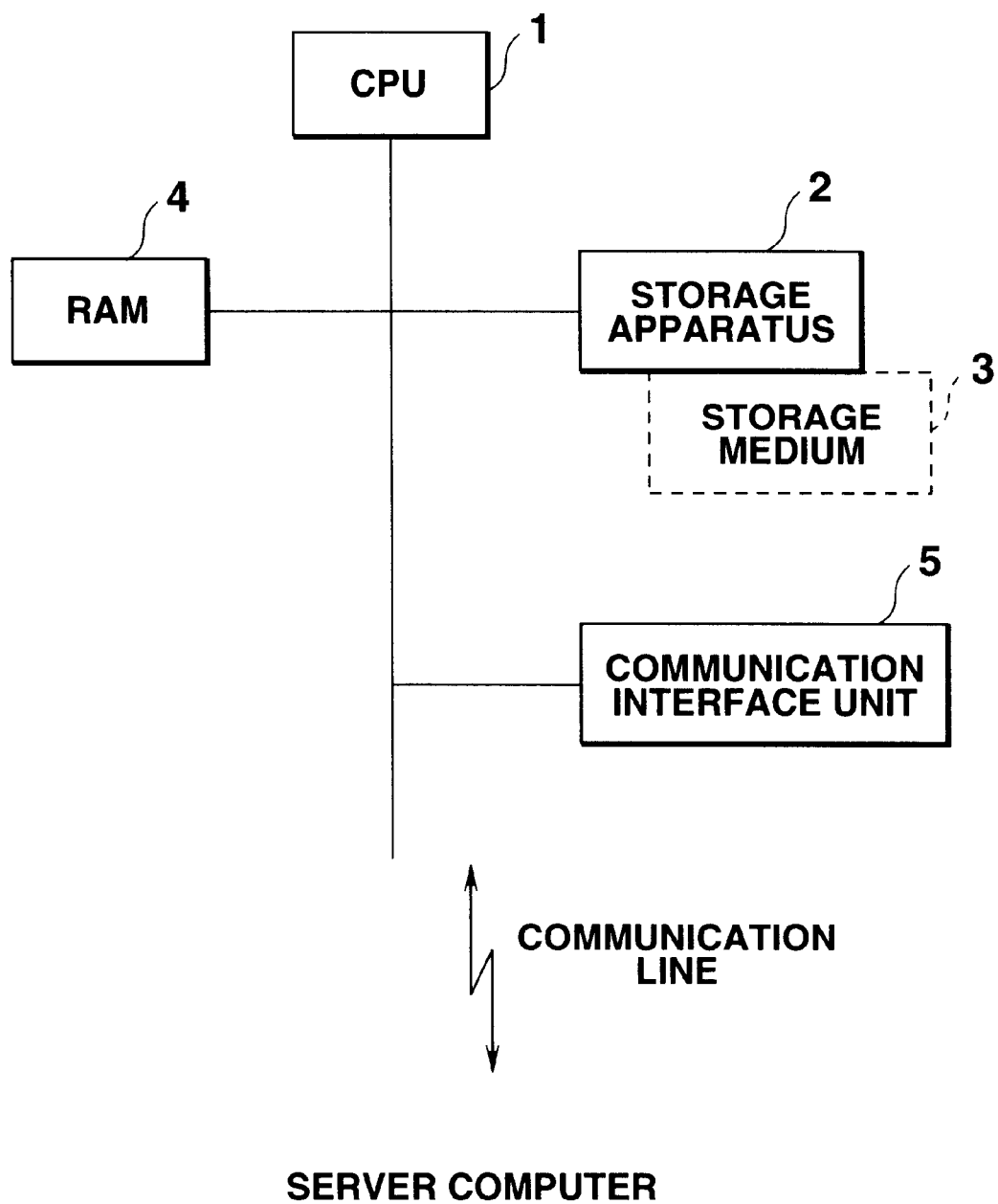
FIG. 2 schematically represents an overall structural diagram of a server computer SRC according to an embodiment of the present invention.

FIG. 2 is a block diagram for schematically indicating an overall structure of a server computer SRC according to an embodiment of the present invention.

A CPU (central processing unit) 1 is such a central processing unit for controlling an overall operation of this server computer SRC in accordance with various sorts of computer programs. A storage apparatus 2 contains a storage medium 3 and a drive system of this storage medium 3. This storage medium 3 previously stores thereinto an operating system (OS), various sorts of application programs, the merchandise information database SDB, and the like. This storage medium 3 may be fixed with the storage apparatus 2, or may be detachably mounted on this storage apparatus 2. The storage medium 3 may be constituted by a magnetic storage medium, an optical storage medium, and a semiconductor memory such as a floppy disk, a hard disk, an optical disk, a magnetic optical disk, and a RAM (random access memory) card. Also, a program and/or data saved in this storage medium 3 are loaded on the RAM 4 under control of the CPU 1, if required. Furthermore, the CPU 1 may receive another program and data, which are transmitted via the communication interface unit 5 from another appliance (not shown) to store these received program and data into the storage medium 3. Alternatively, this CPU 1 may use another program and data via the communication interface unit 5, and these program and data are stored into another storage medium provided in another appliance.

Contents of Database/File/Table in Storage Apparatus

Figures 3A, 3B, 3C:
FIG. 3A schematically indicates a structure of a merchandise information database SDB stored into a storage apparatus 2 of the server computer SRC shown in FIG. 2.
FIG. 3B schematically represents a structure of an access history file AOC stored into the storage apparatus 2 of the server computer SRC indicated in FIG. 2.
FIG. 3C schematically shows a structure of a download management table RDR stored into the storage apparatus 2 of the server computer SRC represented in FIG. 2.

FIG. 3A illustratively indicates a record structure of the above-explained merchandise information database SDB stored in the storage apparatus 2 of the server computer SRC. A record corresponding to one commodity (goods) is constituted by various items such as a merchandise code indicative of an attribute of this commodity; a merchandise name; a name of a maker (manufacturer); a size; a register data; - - - , and an image link number. In this embodiment, a "register data" indicates such a data that a relevant merchandise record is newly registered, or updated. An "image link number" is link information for instructing a call of a merchandise image file which is stored in one image-to-one file format.

FIG. 3B illustratively shows a structure of the access history file AOC stored in the storage apparatus 2 of the server computer SRC. This access history file AOC stores thereinto an access history derived from a client with respect to the merchandise information database SDB. In the access history file AOC, a merchandise code, an access client name, and an access data are stored as historical information. In other words, this historical information may indicate as to who has accessed which merchandise code and when this merchandise code is accessed. Every time an access request is made to the merchandise information database SDB, access historical information is produced to be stored into the access history file AOC. In this embodiment, the CPU 1 refers to the access history file AOC when a record saved in the merchandise information database SDB, extracts such a client computer which has accessed this relevant record saved in the merchandise information database SDB in the past, and transmits to this client computer, a change notification for notifying such a fact that the relevant record saved in the merchandise information database SDB has been changed.

FIG. 3C illustratively shows a structure of the download management table RDR stored in the storage apparatus 2 of the server computer SRC. This download management table functions as such a table for managing such a client computer which has not yet downloaded a changed record in the case that after a certain record stored in the merchandise information database SDB has been changed, even when a time period longer than a preselected time period (for example, 1 week) has passed, the above-described client computer which has accessed this record before being changed in the past does not download the changed record. Then, this download management table RDR is arranged by such that dates of changing records and accessing persons who have not yet downloaded such changed records are stored, depending upon merchandise codes of changed records. In this embodiment, the CPU 1 refers to this download management table RDR once a day when the scheduler is initiated in order to monitor as to whether or not there is any accessing person who has not yet downloaded a changed record. When such an accessing person who has not yet downloaded the changed record is present, this CPU 1 transmits a downloading request to this accessing person.

Overall Arrangement of Client Computer

FIG. 4 is a schematic block diagram for representing an overall arrangement of each of the above-described client computers CTCs employed in the client/server network system of FIG. 1.

As a major unit of this client computer CTC, a CPU (central processing unit) 11 is employed. The CPU 11 controls an overall operation of this client computer CTC in accordance with various sorts of computer programs saved in a storage apparatus 12. This storage apparatus 12 contains a storage medium 13. Since these storage apparatus 12 and storage medium 13 are basically constituted in a similar manner to the above-explained storage apparatus 2 and storage medium 3 employed in the server computer SRC side, detailed descriptions thereof are omitted. A program and data saved in this storage medium 13 are loaded to a RAM (random access memory) 14, if required. To this CPU 11, the following input/output apparatuses are connected, i,e., an input apparatus 15, a display apparatus 16, a print apparatus 17, and a communication interface unit 18. In response to an input/output program, the CPU 11 controls input/output operations of these input/output apparatuses 15 to 18. The input apparatus 15 contains a pointing device such as a keyboard and a mouse. The pointing device is used to enter character stream data such as a record retrieve condition, and also to input various sorts of commands into the client computer CTC. In the client computer CTC for the registrant, according to this embodiment, a digital camera DCA 19 functioning as an image input apparatus is detachably mounted on the input apparatus 15. Thus, an image of merchandise photographed by this digital camera DCA 19 is acquired via the input apparatus 15 into the client computer CTC for the registrant. It should be understood that the display apparatus 16 may be realized by a multi-color representation liquid crystal display, (LCD) device, a CRT (cathode-ray tube), or a plasma display device, and furthermore, the print apparatus 16 may be realized by a full color printer apparatus such as a non-impact printer and a dot impact printer. As this non-impact printer, there are a heat transfer type printer and an ink jet type printer.

Operations by Client Computer CTC

Next, various operations executed by this client/server network system will now be described with reference to flow charts shown in FIG. 5 to FIG. 8. It should also be noted that a computer program capable of realizing various functions as described in these flow charts is stored into the storage medium 3 and/or the storage medium 13 in the form of a computer readable program code. Therefore, this client/server network system may be operated in accordance with this computer program.

Figure 6:
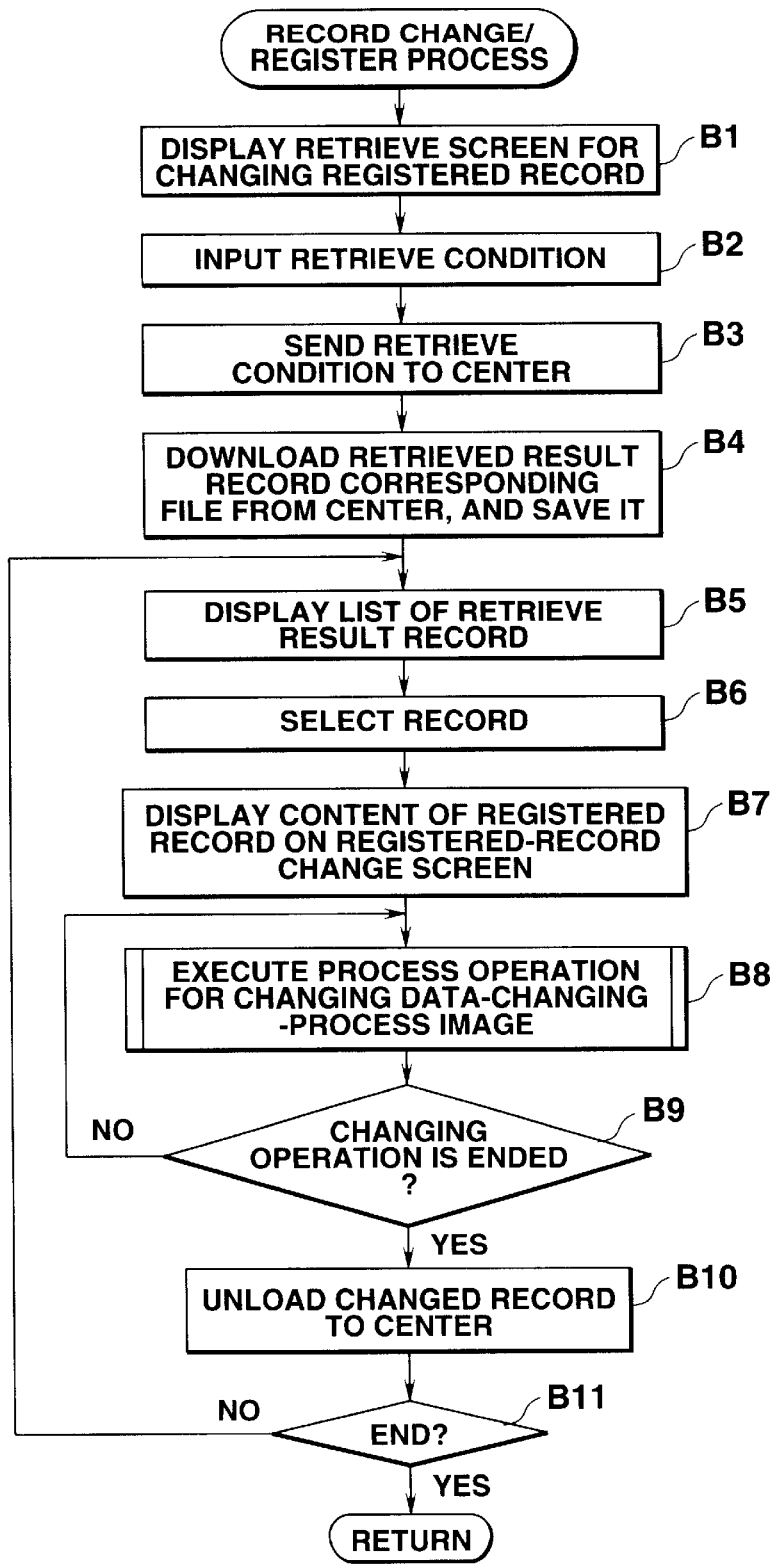
FIG. 6 is a flow chart for describing operations of the client computer CTR for a registered operator in such a condition that a record changing operation is instructed.
Figure 7:
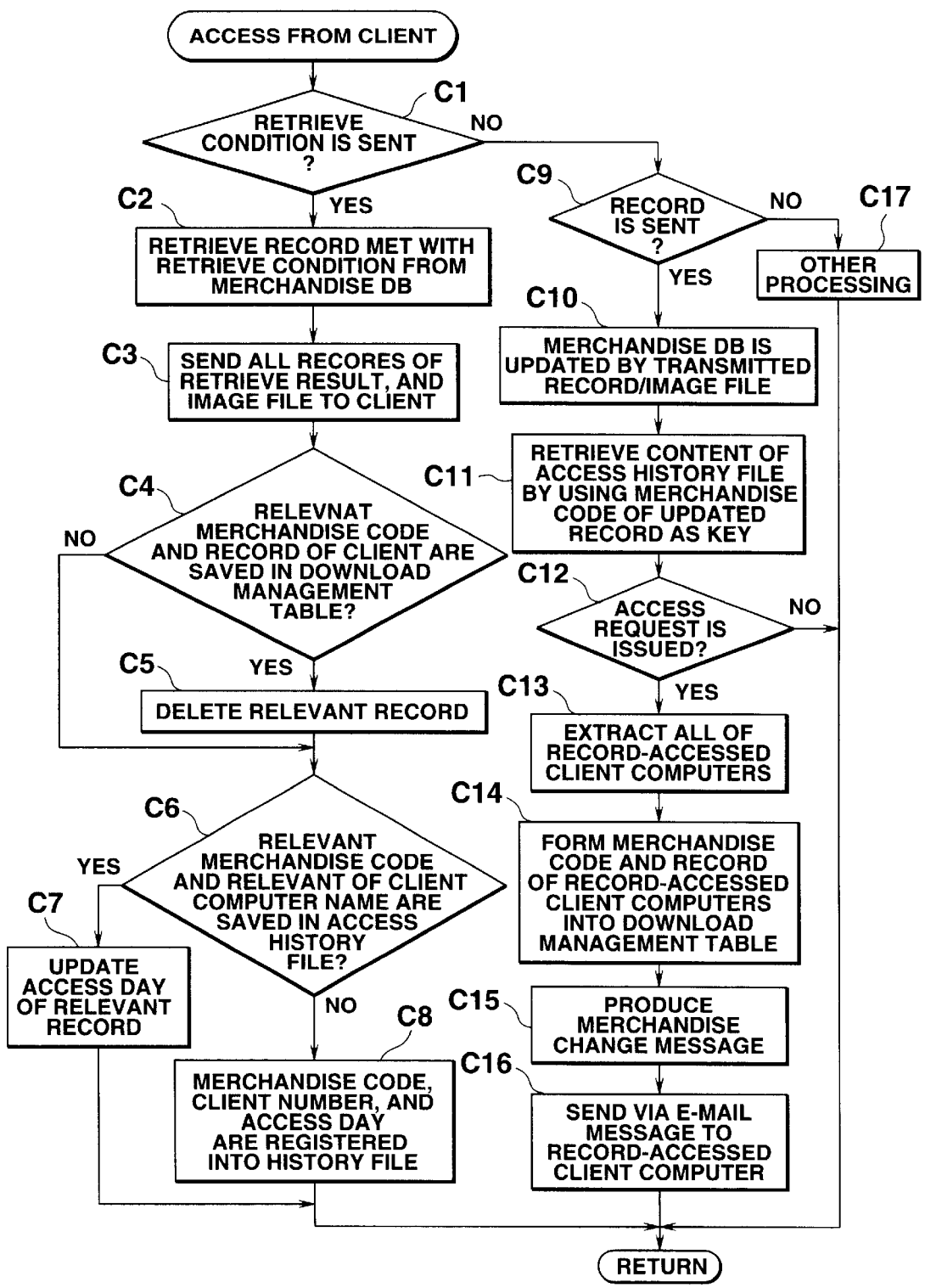
FIG. 7 is a flow chart for explaining operations of the server computer SRC shown in FIG. 2.

Precisely speaking, FIG. 5 and FIG. 6 show flow charts for describing operations executed on the side of the client computer CTC. FIG. 7 and FIG. 8 represent flow charts for describing operations executed on the side of the server computer SRC. FIG. 5 indicates a flow chart for explaining operations performed in such a case that a record is retrieved.

The record retrieving operation is commenced by depressing a retrieve key in the client computer CTC. In the flow chart shown in FIG. 5, a retrieve screen is displayed at a first stage (step A1). In this case, condition input areas are displayed on this retrieve screen with respect to each of the condition items such as a name of a manufacturer, and a merchandise classification. Then, when the retrieve condition is entered via the retrieve screen (step A2), the CPU 11 of the client computer CTC transmits the entered retrieve condition to the center side, and thereafter waits for a response, or answer (step A3). As a result, when a retrieved result (for example, desired record and image file) is downloaded from the center side to the client side functioning as the request source, this retrieved result is temporarily saved in the RAM 14 (step A4). Then, the CPU 11 reads the respective records corresponding to the retrieved result out from the RAM 14, and furthermore, extracts a data portion such as a merchandise code and a merchandise name from each of these read records so as to display a list of these extracted data portions (step A5). When an arbitrary record is selected from this list screen by manipulating a mouse and the like (step A6), a detailed list screen is displayed, so that various sorts of merchandise character information and also various sorts of merchandise images contained in the selected record are indicated more in detail (step A7). At this step, in such a case that a record save key (not shown) is selectively manipulated so as to enter a save instruction (step A8), the selected record displayed on this detailed screen is registered/saved in the own merchandise information database LDB (local)(step A9). Thereafter, the CPU 11 checks as to whether or not an end instruction is issued (step A10). If NO, then the process operation is returned to the previous step A5 until such an end instruction is issued. Thus, the above-described process operations are repeatedly carried out. As a consequence, only such a necessary record can be selected from all of these records which can satisfy the retrieve condition, and the selected record can be saved in the own local database on the side of the client computer CTC.

FIG. 6 is a flow chart for explaining such an operation that a record saved in the merchandise information database SDB provided on the server side is changed on the side of a client computer to which a right as a registrant is given. First, when updating of a record is instructed, a retrieve screen for changing a registered record is displayed (step B1). Then, the retrieve condition is entered via the retrieve screen (step B2), the CPU 11 of the client computer CTC for the registrant transmits the entered retrieve condition to the center side (step B3). In response to this retrieve condition, when a retrieved result (for example, desired record and image file) is downloaded from the center side to the registrant side, this retrieved result is temporarily saved in the RAM 14 (step B4). Then, the CPU 11 reads the respective records corresponding to the retrieved result out from the RAM 14, and furthermore, extracts a data portion such as a merchandise code and a merchandise name from each of these read records so as to display a list of these extracted data portions (step B5). When an arbitrary record is selected from this list screen by manipulating a mouse and the like (step B6), a registered content is displayed on a registered record changing screen (step B7). A merchandise image and also merchandise character information are displayed in detail on this registered record changing screen. Then, a data changing process operation and an image changing process operation are carried out, by which both the merchandise character information and the merchandise image displayed on this registered record changing screen are changed (step A8). In this case, when the merchandise character information is changed, a changing position is designated, a character is deleted, a character is added, and a character is replaced by another character in a similar manner to the normal information changing operation. Also, when the merchandise image is changed (namely, when one merchandise image is replaced by another merchandise image), an image is entered which is newly photographed by the digital camera DCA 19, and then the old image is replaced by this newly acquired image. Such a changing process operation is repeatedly carried out until a completion of changing a content of 1 record is instructed (step B9). As a consequence, when changing of the content of 1 record is accomplished, the changed record is uploaded to the center side (step B10). Then, the CPU 11 checks as to whether or not the completion of changing of all records is instructed (step B11). If NO, then the process operation is returned to the previous step B5 until such a completion instruction is issued, and then a similar changing process operation to the above-described changing process operation is repeatedly carried out.

Operations by Server Computer

FIG. 7 is a flow chart for describing operations executed on the side of the server computer SRC when an access operation is made by a client computer side.

In this flow chart, when an access request issued from a client computer is to request a record retrieving operation (step C1), the CPU 11 retrieves the contents of the merchandise information database SDB based upon a retrieve condition sent from the client computer side (step C2), and then extracts all of records which can satisfy this sent retrieve condition from this merchandise database SDB, and thereafter transmits all of the extracted records to the client computer functioning as the request source (step C3). In this case, the CPU 1 reads out an image file stored in this merchandise information database SDB based on an image link number contained in a retrieved record, and thus, transmits this read image file to the request source in combination with the merchandise record corresponding to this image file. After the retrieved result is downloaded to the client computer functioning as the request source in this manner, the CPU 11 refers to the download managing table RDR in order to check as to whether or not such a record is present in this download management table RDR (step C4). This record contains both a merchandise code within the retrieve result record and a client name (accessing person) functioning as a request source. In this case, when the merchandise record and the image file thereof corresponding to the retrieved result are not changed, and even when these record and file are changed, if this client computer has not yet accessed the record before being changed, then the relevant record is not present in the download management table RDR. In such a case that the merchandise record is changed and another image is again photographed, and furthermore, the client computer has once accessed the merchandise record before being changed, this client computer is deleted from client computers which have not yet downloaded the changed record, since the changed record is downloaded to this client computer at this time. Therefore, the relevant record saved in the download management table RDR is deleted (step C5). Next, the CPU 1 refers to the access history file AOC so as to check as to whether or not both a merchandise code and a client name, which correspond to the present retrieved result, are stored as historical information into this access history file AOC (step C6). In this step, when the corresponding historical information is saved, this access date is changed into a present system date (step C7). Conversely when the corresponding historical information is not saved, the CPU 1 produces such access historical information, and newly registers this access historical information into the access history file AOC (step C8). This newly registered access historical information is constituted by a merchandise code, a name of an accessing client computer, and an access day (present date) in connection with the present access operation.

On the other hands, in such a case that an access request, issued from a client computer is to change a registered record, the CPU 11 detects that a changed record is transmitted at a step C9. In other words, the CPU checks as to whether or not the client computer for the registrant issues such a record changing request at this step C9. It should also be noted that neither the retrieve condition, nor such a record changing request is issued, other normal process operations are executed (step C17). To the contrary, in the case that the record changing request is issued from the client computer for the registrant, the CPU 1 updates/registers this changed record into the merchandise information database SDB (step C10). At this time, when the merchandise image is renewed on the registrant side, and this renewed merchandise image is also transmitted in combination with the changed record, this renewed merchandise image is additionally registered as the image file into the merchandise information database SDB. Then, the CPU 1 retrieves the access history file AOC while using the merchandise code of the updated record as a retrieve key (step C11), and then checks as to whether or not historical information corresponding to this merchandise code is present (step C12). In other words, when the record is changed, the CPU 1 checks as to whether or not the record before being changed has been accessed in the past. If this record has not yet been accessed in the past, then the process operation escapes from the present process flow. To the contrary, if this record has been accessed in the past, then the CPU 1 extracts all of the client computers which have accessed this record before being changed from the access history file AOC (step C13). Then the CPU 1 produces the below-mentioned record every accessing client computer, and then registers the produced record into the download management table RDR (step C14). In this produced record, this merchandise code, the record-accessed client computers extracted from the access history file AOC, and also the present system date are set as a record changed day. Thereafter, the CPU 1 produces a merchandise change message for indicating such a fact that information about this merchandise has been changed (step C15). Then, the CPU 1 transmits the merchandise change message to all of the record-accessed client computers via an electronic mail so as to transfer this electronic mail to mail software installed in the record-accessed client computers (step C16).

FIG. 8 is a flow chart for describing operations of the server computer SRC in the case that this server computer SRC executes server operations one time every day by initiating a scheduler. First, in this flow chart, the CPU 1 employed in this server computer SRC refers to a change day saved in the download management table RDR, and extracts such a record saved in this download management table RDR that more than 1 week has elapsed from this change day (step D1), and furthermore sorts the extracted records with respect to each of the record-accessed client computers (step D2). Then, the CPU 1 forms a download request message in which names of merchandise which have not yet been downloaded are listed up with respect to each of the record accessed client computers (step D3). This CPU 1 sends this download request message to the respect record-accessed client computers via an electronic mail (step D4).

As previously described, in the above-described client/server network system, every time the client computer issues the request for retrieving the respective records saved in the merchandise information database SDB, while storing such an access history into the access history file AOC, when the record saved in the merchandise information database SDB is changed, the CPU refers to this access history file AOC so as to specify the client computer which has accessed the record before being changed, and then notifies such a message that this record is changed to this record-accessed client computer. The above-explained access history indicates which client computer has accessed which merchandise record, and when this client computer has accessed. As a consequence, the changed record can be immediately downloaded on the side of the client computers.

It should also be understood that in the above-described embodiment, the CPu notifies the record change message to all of the record-accessed client computers. Alternatively, the CPU may notify such a record change message to all of client computers which have accessed the same database. Furthermore, the merchandise information is exemplified as the database. Alternatively, personnel information and account information may be employed as this database. Also, the broad area communication system is exemplified.

Alternatively, a local area network (LAN) may be used. In this LAN case, not only the merchandise image common system, but also a general data common system such as group ware may be employed.

What is claimed is:

1. A server computer comprising:

a database;

transmission means for transmitting data stored in said database to a plurality of client computers which are connected via a network to said server computer, the transmission of data occurring in response to access requests of using the data, which are issued from said plurality of client computers;

history storage means for storing access histories of respective client computers which have accessed said database so as to use the data stored in said database;

transmission means for transmitting the data stored in said database to one client computer of the plurality of client computers which requests to change/register a content of said data stored in the database;

update means for updating a content of relevant data stored in the database by the changed content of said data by receiving said changed content data transmitted from said one client computer;

extraction means operated in such a manner that when the data content of said database is updated by receiving the changed data content from said one client computer, other client computers among said plurality of client computers which have accessed the database before being updated are extracted based upon said access histories stored in the history storage means; and notification information transmitting means for transmitting to said extracted client computers information that the content of said database is updated, wherein:

said history storing means stores an access history of a client computer for every record contained in said database, which has accessed each of the records contained in said database; and said extracting means extracts a client computer based upon said access history of said record stored in said history storing means, said client computer having accessed a record before being updated when the record contained in the database is updated;

said access issued from the client computer is a download access used to download an arbitrary record contained in said database to a client computer as the access source; and said history storing means stores an access history of said client computer which has downloaded said arbitrary record with respect to each of the records;

said database stores a plurality of records;

said download-history storage means stores into respective records, the download histories of the client computers functioning as access sources which have downloaded each of the respective records contained in the database;

said extraction means is operated such that when the respective records contained in the database are updated, client computers which have downloaded records before said records were updated are extracted based upon said download history of said record, which is stored in said download-history storage means; and said message notification/transmission means provides notification that said record stored in the database is updated.

2. The server computer as defined by claim 1 wherein:
said server computer is further comprises:
monitoring means for monitoring whether a data access request is newly issued from a client computer which has transmitted notification information after said notification information was sent from said transmitting means to said client computer; and
said transmitting means retransmits the notification information to the relevant client computer in the case that said monitoring means judges that said relevant client computer does not issue a data access request for a predetermined time period.

3. A server computer comprising:
a database;
means for downloading/transmitting data stored in said database to a plurality of client computers connected via a network to said server computer in response to data downloading requests issued from at least one of said plurality of client computers;
download-history storage means for storing download histories as to said data stored in the database with respect to each of said plurality of client computers which have requested to download said data;
extraction means operated such that when a content of data stored in said database is updated, client computers which have downloaded data from the database before the content of data was updated are extracted based upon said download histories stored in the download-history storage means;
transmission means for transmitting notification information for notifying that said data content stored in the database is updated to the respective client computers extracted by said extraction means;
monitoring means for monitoring whether or not each of said respective client computers again requests to download said updated data stored in the database after said notification information has been transmitted to the respective client computers extracted by said extraction means; and
means for extracting client computers from among said plurality of client computers which do not download said updated data within a predetermined time period from said extracted client computers to which said notification information is transmitted, and for transmitting a message notification to each of said extracted client computers, said notification information prompting said extracted client computer to download said updated content of data, wherein:.
said database stores a plurality of records;
said download-history storage means stores into respective records, the download histories of the client computers functioning as access sources which have downloaded each of the respective records contained in the database;
said extraction means is operated such that when the respective records contained in the database are updated, client computers which have downloaded records before said records were updated are extracted based upon said download history of said record, which is stored in said download-history storage means; and
said message notification/transmission means provides notification that said record stored in the database is updated.

4. The server computer as defined by claim 3 wherein:
said message notification/transmission means extracts records which are not downloaded after said notification of updating of the record has been issued to the client computers to which the updated records which accessed the record are notified, and transmits said notification message containing a list of said undownloaded records.

5. A storage medium for storing a program code readable by a server computer which includes a database, said program code comprising:
a function for transmitting data stored in said database to a plurality of client computers connected via a network to said server computer in response to access requests of using the data, which are issued from at least one of said plurality of client computers;
a function for storing access histories of respective client computers which have accessed said database so as to use the data stored in said database;
a function for transmitting the data stored in said database to one client computer of the plurality of client computers which requests to change/register a content of said data stored in the database;
a function for updating a content of data stored in the database by the changed content of said data by receiving said changed content data transmitted from said one client computer;
a function such that when the data content of said database is updated by receiving the changed data content from said one client computer, other client computers which have accessed the database before the data content was updated are extracted based upon said access histories; and
a function for transmitting information that the content of said database is updated to said extracted client computers, wherein:
said storing function stores an access history of a client computer for every record contained in said database, which has accessed each of the records contained in said database;
said extracting function extracts a client computer based upon said access history of said record, said client computer having accessed a record before being updated when the record contained in the database is updated;
said access issued from the client computer is a download access used to download an arbitrary record contained in said database to a client computer as the access source;
said storing function stores an access history of said client computer which has downloaded said arbitrary record with respect to each of the records;
said database stores a plurality of records;
said download-history storing function stores into respective records, the download histories of the client computers functioning as access sources which have downloaded each of the respective records contained in the database;
said extracting function operates such that when the respective records contained in the database are updated, client computers which have downloaded records before said records were updated are extracted based upon said download history of said record; and
said function for message notification/transmission provides notification that said record stored in the database is updated.

* * * * *